R. HUFF.
MOTOR VEHICLE.
APPLICATION FILED OCT. 13, 1910.
1,082,026.
Patented Dec. 23, 1913.
2 SHEETS—SHEET 2.
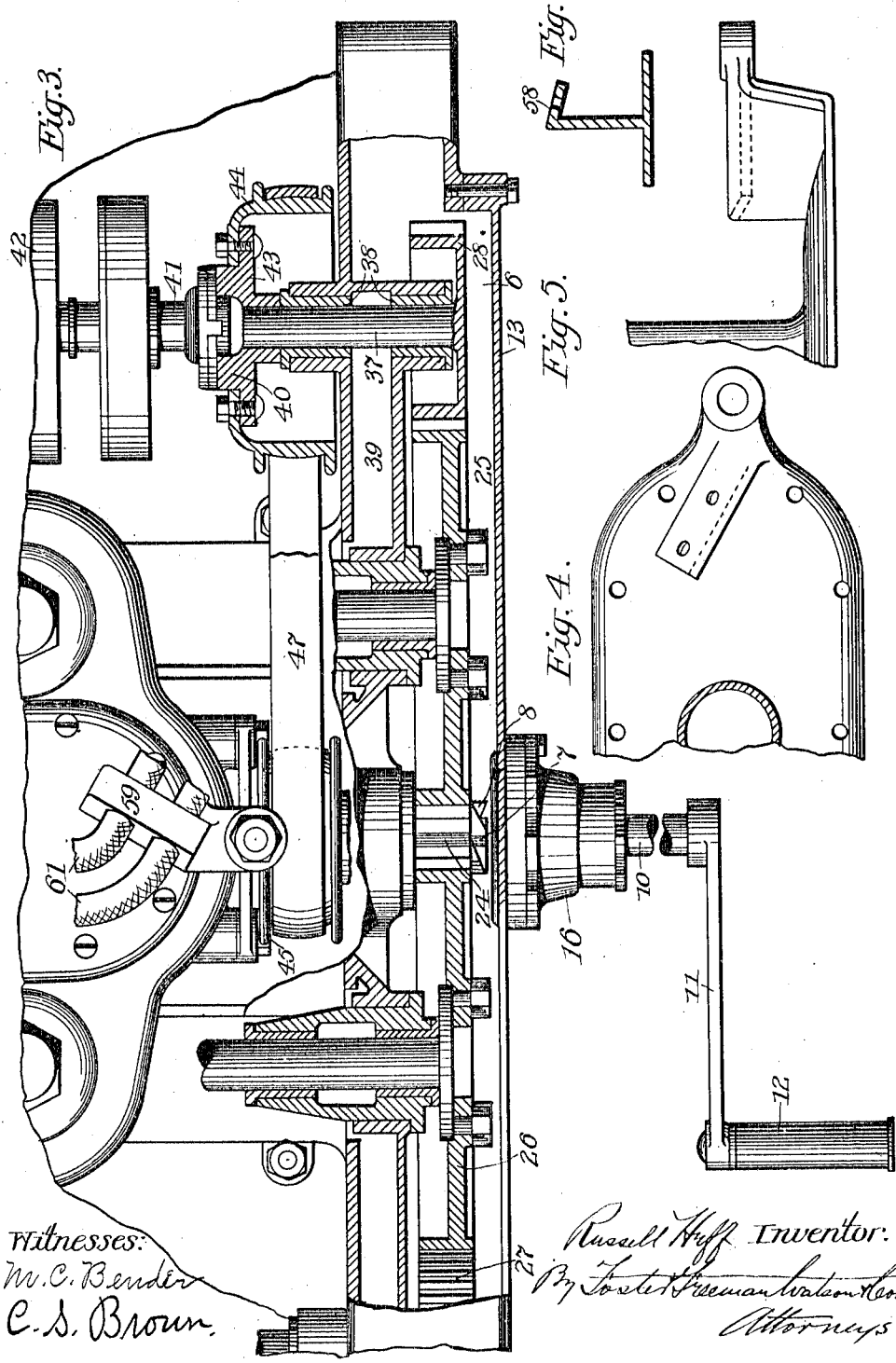

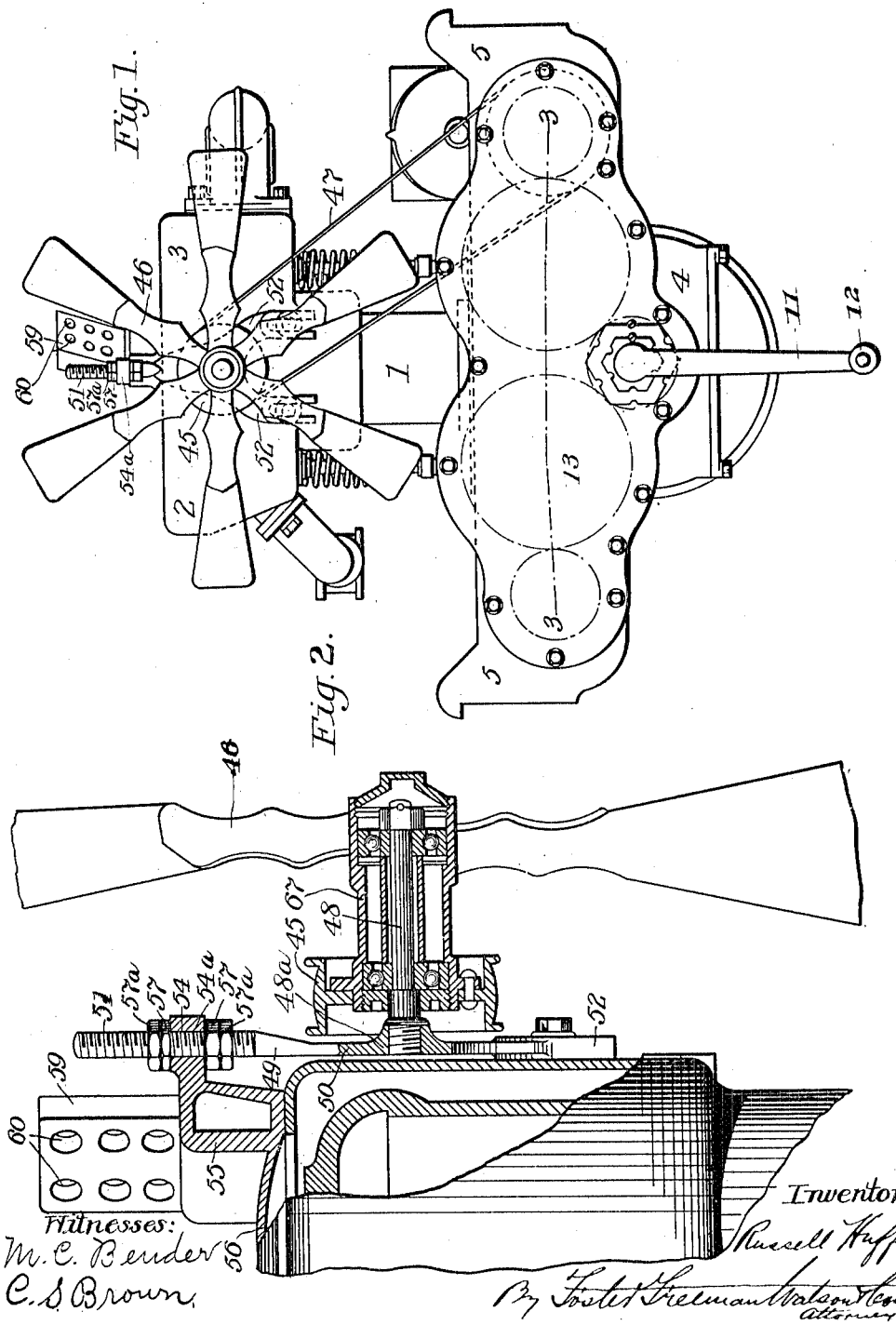

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,082,026.  Specification of Letters Patent.  Patented Dec. 23, 1913.

Original application filed June 27, 1908, Serial No. 440,699. Divided and this application filed October 13, 1910. Serial No. 586,912.

*To all whom it may concern:*

Be it known that I, RUSSELL HUFF, a citizen of the United States, and resident of Detroit, Wayne county, State of Michigan, have invented certain new and useful Improvements in Motor-Vehicles, of which the following is a specification.

This application is a division of my application, Serial No. 440,699, filed June 27, 1908.

This invention relates to motor vehicles and particularly to the supporting means for the cooling fan and the associated parts of such means. It has special reference to the arrangement of the adjustable fan bracket and the supporting means for the high tension wires of the motor.

One of the objects of my invention is to construct a fan bracket that is of simple design and is readily adjustable.

Another object of my invention is to construct a supporting bracket for the fan bracket which will also act as a supporting means for the high tension wires of the motor.

Other objects and features of my invention will be apparent from the following description.

In the accompanying drawings, Figure 1 is a front elevation of a motor embodying my invention; Fig. 2 is a view partly in vertical section of the fan and its adjustable bracket; Fig. 3 is a cross section on the line 3—3 of Fig. 1; Fig. 4 is a plan view of a portion of the cover of the water jacket of the cylinder showing my improved bracket support; Fig. 5 is a detail side view of what is shown in Fig. 4; and Fig. 6 is a cross section of the bracket shown in Fig. 5.

In the drawings, 1 represents one of the cylinders of a hydrocarbon motor which is provided with the inlet and exhaust chambers 2, 3. The crank case 4 has preferably at its front end the laterally extending hollow arms 5, the ends of which are adapted to rest upon the side bars of the motor vehicle frame, as will be understood. These hollow arms form a gear case 6 in which are mounted a train of gears for driving the cam shafts, water pump and magneto for properly operating the motor. The crank shaft 7 extends through the crank case into the gear case 6 and there terminates, carrying upon its end the clutch teeth 8 with which the clutch teeth of the starting shaft 10 coöperate. The starting shaft is provided with the usual crank arm 11 and handle 12 for manually operating it to start the engine. The front end of the gear case 6 is provided with a removable cover 13 to which is secured a sleeve 16 in which the starting shaft 10 is mounted. For a further description of this starting shaft, reference may be had to the above mentioned parent application.

On the end of the crank shaft 7 is secured a driving gear 24 which meshes with the cam shaft gears 25, 26, which latter gears drive the gears 27, 28, on the pump and magneto shafts respectively. The magneto shaft 37 is mounted in spaced bearings 38 in the crank case arm and is oiled by the spray from the crank case reaching it through the channel 39. On the rear end of the shaft 37 is mounted one of the members 40 of a universal coupling by which it is connected with the armature shaft 41 of the magneto 42. The member 40 has an annular flange 43 formed integral therewith and to this flange is bolted the web of a pulley 44, which pulley extends forwardly from said shaft. The pulley 44 is arranged in a vertical plane with the pulley 45 which is secured to the hub of the fan 46 so that the fan may be driven by a belt 47 passing over these pulleys.

The fan and its pulley are mounted upon a bracket on the front side of the forward motor cylinder, and this bracket is adjustably secured to a bracket carried by the cover of the water jacket of the cylinder. As will be seen by reference to Fig. 2, the hub 67 of the fan surrounds the spindle 48 and is mounted on ball bearings thereon. This spindle 48 projects forwardly from the bracket 49, being rigid therewith and formed in any suitable way. As shown, it is screwed into a suitable boss 48ª on the bracket. The bracket 49 is formed of a central vertical portion 50 which carries the spindle 48, an upwardly extending screw-threaded portion or arm 51, and two downwardly extending separated arms 52 which are bifurcated at their lower ends forming slots parallel with the arm 51. The arms 52 are adjustably secured to the end wall of the cylinder by bolts 53 fastened in the bosses in the cylinder through the slots. The arm 51 passes through an opening 54 formed in a forward extension 54ª of a bracket 55 carried by the water jacket cover 56, and is adjustably secured to said latter bracket by the two nuts 57 arranged on opposite sides of the extension 54ª. By adjusting these nuts the bracket may be raised or lowered and may be held firmly in adjusted position by the nuts 57ª and the bolts 53, thus permitting tension adjustment of the belt 47.

The bracket 55 carried by the water jacket cover 56 may be integral with the cover or may be secured thereto in any suitable way. This bracket has a suitably inclined ledge 58 upon which is mounted a support 59 for the high tension wires of the motor, this support being preferably composed of fiber block with suitable openings 60 therein for the passage of the ignition wires 61 which are adapted to be connected with the magneto. Thus it will be seen that the water jacket cover 56 has formed integral with it or rigidly secured thereto a bracket for holding the supporting means for the ignition wires and an extension for supporting the upper end of the fan bracket.

Having thus described my invention, what I claim is:

1. A fan bracket comprising a central portion carrying a rigid shaft at right angles thereto constituting a fan bearing, an end portion in the form of a screw-threaded rod, and an end portion opposite the screw-threaded portion made up of spaced arms, the ends of which are bifurcated and parallel to the screw-threaded portion.

2. The combination with a casing, of a bracket fitting against said casing and having an end in the form of a screw-threaded rod, an arm projecting from said casing and provided with an opening through which said screw-threaded portion extends, nuts on said screw-threaded portion on opposite sides of said arm, spaced arms on said bracket parallel with the screw-threaded portion and having bifurcated ends, bolts on said casing engaging said bifurcated ends, and a fan carried by said bracket.

3. In a device of the class described, the combination with a hydrocarbon motor, of a bracket supported on the casing of the motor cylinder, a support for high tension electric cables on said bracket, an arm on said bracket extending beyond the cylinder and a fan bracket adjustably connected to said arm.

4. In a device of the class described, the combination with a hydrocarbon motor, of a bracket supported on the cover of the motor cylinder, a support for high tension electric cables mounted on said bracket, an arm on said bracket extending beyond the edge of the cylinder and provided with a vertical hole, a fan bracket on the side of said cylinder having an upper screw-threaded portion extending through said arm, and nuts on said screw-threaded portion on opposite sides of said arm.

5. In a device of the class described, the combination with a hydrocarbon motor, of a bracket supported on the cover of the motor cylinder comprising an upright web, a transverse flange and an end arm projecting beyond the edge of the cylinder, a support for high tension electric cables secured on said transverse flange, and a fan bracket at the side of said cylinder having its upper end secured to said arm.

6. In a device of the class described, the combination with a hydrocarbon motor, of a crank shaft, operating mechanism including a magneto shaft connected by gearing to said crank shaft, a vertically movable bracket having spaced arms making sliding engagement with the cylinder of said motor, means on said cylinder for vertically adjusting said bracket, a rigid shaft carried by said bracket parallel with the magneto shaft, a fan mounted on said rigid shaft and provided with a pulley, and a pulley on said magneto shaft adapted to drive the fan by belt connection.

7. In a device of the class described, the combination with a hydrocarbon motor, of a crank shaft, operating mechanism including a magneto shaft connected by gearing to said crank shaft, a vertically movable bracket one end of which is screw-threaded and the other end of which is made up of spaced arms provided with vertical slots, bolts on the cylinder of said motor working in said slots, an arm on said cylinder having a perforation through which the screw-threaded portion of the bracket extends, a rigid shaft carried by said bracket parallel with the magneto shaft, a fan mounted on said rigid shaft and provided with a pulley, and a pulley on said magneto shaft adapted to drive the fan by belt connection.

In testimony whereof I affix my signature in presence of two witnesses.

RUSSELL HUFF.

Witnesses:
C. I. DALE,
W. H. FINCKEL, Jr.